(12) United States Patent
Hough

(10) Patent No.: US 10,111,502 B2
(45) Date of Patent: Oct. 30, 2018

(54) CIRCUMFERENCE OR LENGTH DECREASING DEVICE

(71) Applicant: Robin Darnell Hough, Suisun City, CA (US)

(72) Inventor: Robin Darnell Hough, Suisun City, CA (US)

( * ) Notice: Subject to any disclaimer, the term of this patent is extended or adjusted under 35 U.S.C. 154(b) by 211 days.

(21) Appl. No.: 15/092,444

(22) Filed: Apr. 6, 2016

(65) Prior Publication Data

US 2017/0290396 A1    Oct. 12, 2017

(51) Int. Cl.
*A44B 99/00*    (2010.01)
*F16B 2/24*    (2006.01)

(52) U.S. Cl.
CPC ............. *A44B 99/00* (2013.01); *F16B 2/245* (2013.01)

(58) Field of Classification Search
CPC .............................. A44B 11/04; A44B 11/065
See application file for complete search history.

(56) References Cited

U.S. PATENT DOCUMENTS

| | | | | |
|---|---|---|---|---|
| 1,166,174 A * | 12/1915 | Bisbee | ...................... | D06J 1/00 160/348 |
| 2,267,235 A * | 12/1941 | Ginnel | ...................... | A41D 1/06 2/309 |
| 2,849,773 A * | 9/1958 | Kaselow | .................. | A41F 9/025 2/221 |
| 6,052,936 A * | 4/2000 | Garcia | ................... | A01K 97/00 224/248 |
| 6,305,056 B1 * | 10/2001 | Hubner | ...................... | A41F 9/02 |
| 9,750,293 B1 * | 9/2017 | Lang | ...................... | A41F 18/00 |

* cited by examiner

*Primary Examiner* — Sarah B McPartlin

(57) ABSTRACT

A small device, substantially flat, used to shorten the length or circumference of a fabric, or other type of materials, while at the same time making the item being altered look appealing by forming a pleat-like appearance. The device is simple and is made of metal, plastic or other rigid material suitable for its purpose. Configured of one body, this device disappears into the folds of the material and disappears as if it was not even there. It is easy to use and virtually undetected by the wearer.

1 Claim, 4 Drawing Sheets

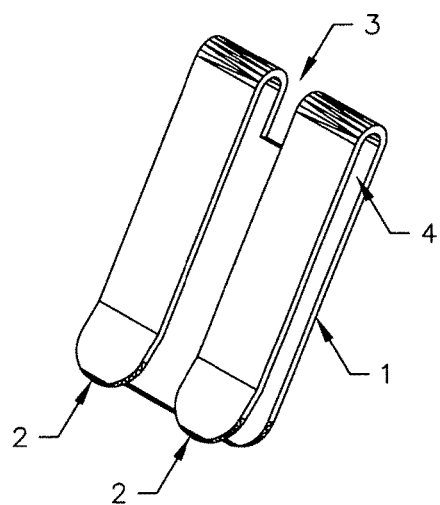
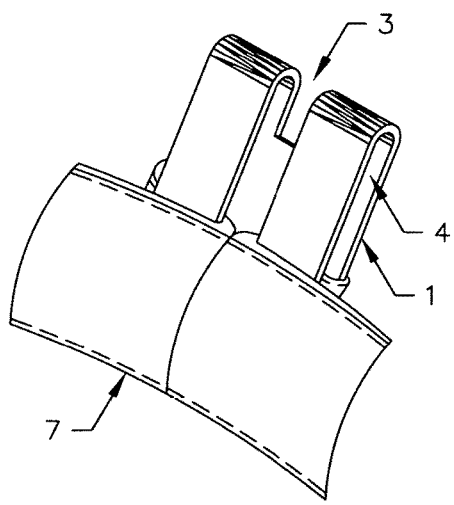
FIG 1          FIG 2
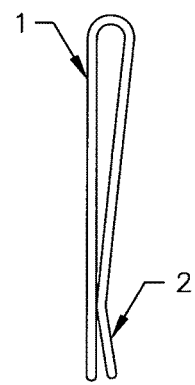
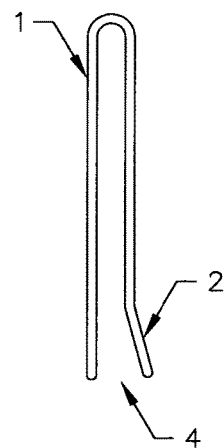
FIG 3          FIG 4

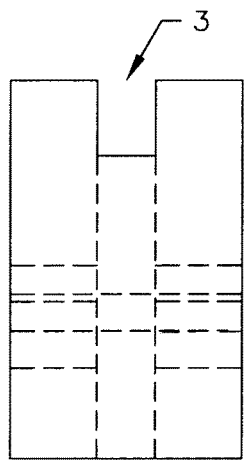
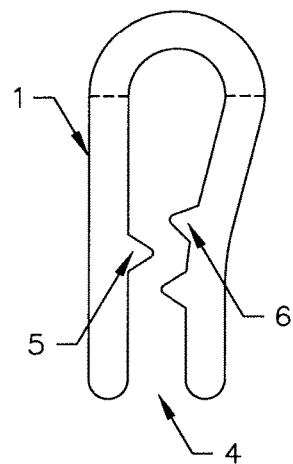
FIG 11
FIG 12
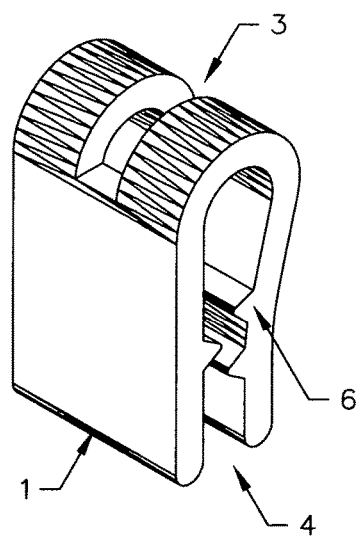
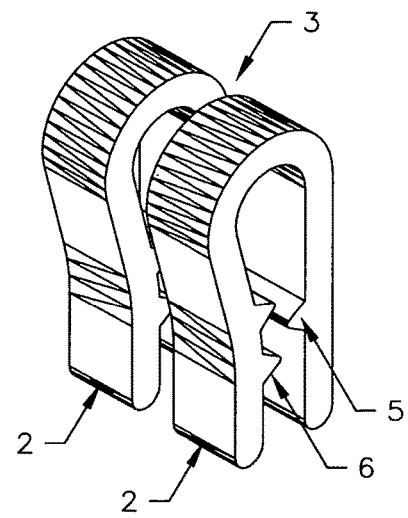
FIG 13
FIG 14

CIRCUMFERENCE OR LENGTH DECREASING DEVICE

BACKGROUND OF THE INVENTION

1. Field of the Invention

This invention relates to a device designed for decreasing the circumference or length of an item such as a garment waistband, neck hole, arm hole, the skirting of a table or other item needing non-permanent alterations, adjustments, decrease in length or circumference.

2. Description of the Prior Art

It has been the practice in the past and present to use safety pins to take-up the slack of the above mentioned, but this method is unsatisfactory due to the fact that safety pins tend to pop open and cause injury, they also give an unattractive appearance to the item needing non-permanent altering. In addition, safety pins also cause damage to the item by leaving holes or snags.

Other disadvantages are that some other tightening devices, such as waistband tighteners, which this device was mainly designed for, however, I have found many other uses, are usually cumbersome, bulky, uncomfortable, and the end results are normally unattractive. For example, in reviewing U.S. Pat. No. 305,056 he describes many disadvantages of other types of devices of this nature. Another problem occurring is that many people do not like wearing bulky belts, this device can remedy that issue.

BRIEF SUMMARY OF THE INVENTION

The object of my invention is to provide a very inexpensive, attractive, non-permanent means of altering the circumference or the length of an item without damaging the item while having an appealing appearance at the same time. This appealing appearance would be that of a professionally tailored dart or pleat, and for said device to be easy to apply, comfortable for the wearer when used in a garment, safe, and invisible since it is almost completely engulfed in the surrounding material. More than one device can be used at a time depending on the take-in need. This invention is for everyone, men, women, and children. It can be used for round necklines, waistbands, arm holes, table skirting, whatever needs to be taken-in.

BRIEF DESCRIPTION OF THE DRAWINGS

FIG. 1 is a perspective view of my device.

FIG. 2 is a perspective view of the device shown in connection with fabric or other material, and shows the manner in which the item needing altering engages with that fabric or other material, the fabric or material being altered is shown having dash marks.

FIG. 3 is a side view of the device with the prongs closing in against back of the device toward the bottom forming a spring-like tension.

FIG. 4 is same as FIG. 3 with prongs not meeting against the back of the device as previously shown.

FIG. 11 is a perspective view of another slight variation of the device.

FIG. 12 is a side view of FIGS. 11, 13, and 14, with this version having teeth-like grips on the inside of the device.

FIG. 13 is a view of the backside of the same version as FIGS. 11, 12, and 14.

FIG. 14 is a perspective view of the same version as FIGS. 11, 12, and 13.

DETAILED DESCRIPTION OF THE INVENTION

Figure 5:
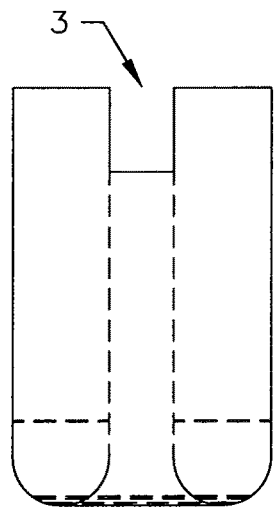
FIG. 5 is a perspective view of the device.
Figure 6:
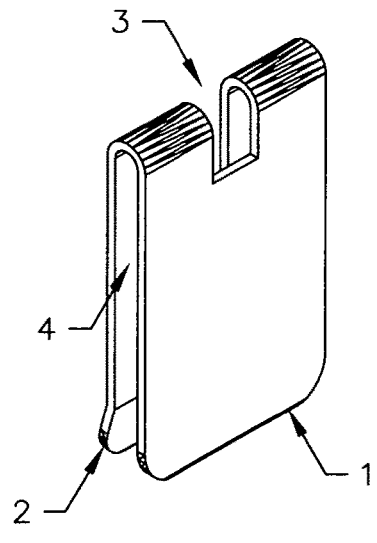
FIG. 6 is a view of the backside of the device with the back side being lengthier than the prongs, how much lengthier is dependent on the need.
Figure 7:
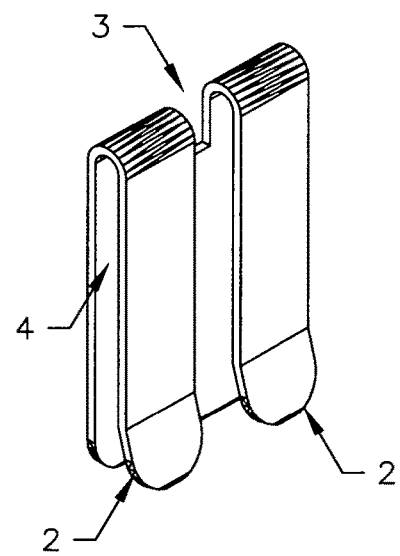
FIG. 7 is a perspective view of a slight variation of the device, which shows the prongs a little lengthier than the back side, how much lengthier is dependent on the need.
Figure 8:
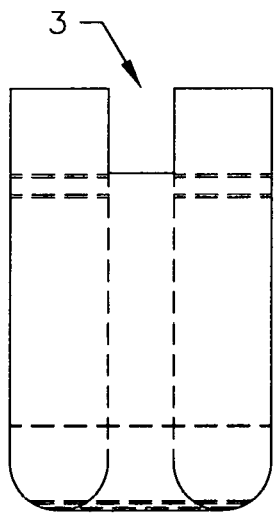
FIG. 8 is a slight variation of a perspective view of the device.
Figure 9:
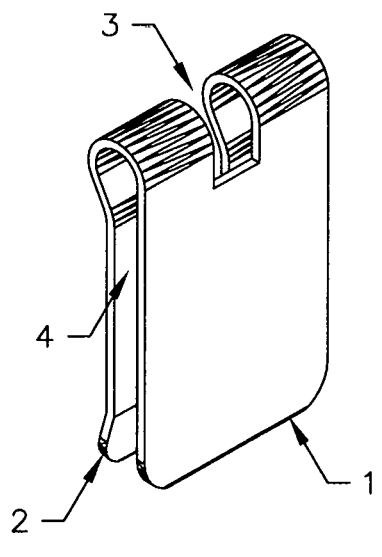
FIG. 9 is a slight variation of the device, showing a more rounded top end.
Figure 10:
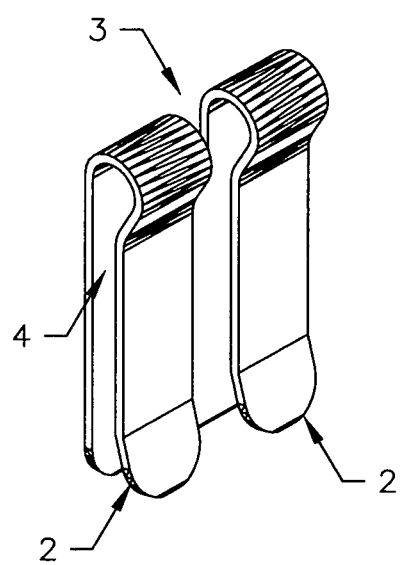
FIG. 10 is a perspective view of a slight variation of the device, showing a more rounded top end.

In reference to the drawings, the body 1 of the device may be configured of any preferred metal, for example, spring or sheet metal, also, of plastic or any other suitable rigid material. The prongs 2 form on the front of the body 1 by being turned downward toward the body leaving a space 4 between the prongs and the body, these prongs 2 are parallel with one another and can be either equal in length to body of said device, longer than body of said device, or shorter than the body of said device. The space appearing between the prongs 2 slightly separates the prongs 2 that run parallel with one another.

In using the device the fabric or other material being used is wrapped around the back of the body 1, each side being brought under 4 the prong closest to that side, and up through the space 3 between the prongs as illustrated in FIG. 2. The device disappears as it is engulfed in the fabric and only a very small portion of the very top of the device can be seen. It becomes quite unnoticeable but results in a beautiful pleat-like appearance.

A variation of the device shows a tooth-like grip 5 on the inside of the body 1, as well as two tooth-like grips 6 on the inside of both prongs 2; this is shown in FIGS. 11-14. This can help keep the device from slipping if the need arises on a plastic version, or any version, of the device. All versions of this device will be subject to sizes, lengths and widths needed to serve the desired effect.

This small yet effective device will be very useful to men, women, children, as well as for table skirting and other means.

CITATIONS

Patent Number

U.S. Pat. No. 2,849,773
U.S. Pat. No. 6,306,056
U.S. Pat. No. 2,267,235
U.S. Pat. No. 1,166,174—When I found this patent I got nervous that it might be the same thing, however, the purpose is different. Their invention is for making pleats (year 1915); my invention, although similar in appearance, is intended for taking up the extra slack in a waistband, neck hole, arm hole etc . . . and other things that are too big in length or circumference.
U.S. Pat. No. 3,282,479

Website Citations http://skinnyclip.com/about.html—(says patent pending)
http://gogingham.com/2012/06/alter-waistband/
https://www.youtube.com/watch?v=31YUdSwy1vA
http://www.amazon.com/Wittle-Waister-Childrens-Adjuster-Adjustablc/dp/B008PF8DYM

The invention claimed is:
1. A device used to decrease a circumference of a worn garment comprising:
   a substantially flat, rectangular body with an upper edge and a bottom free edge;
   two substantially parallel prongs spaced apart from each other and each having a first portion extending upward from the upper edge of the substantially flat, rectangular body, a second bulbous curved portion extending outward from the first portion, a third portion extending downward from the second bulbous curved portion wherein the third portion is spaced apart and substantially parallel to the substantially flat, rectangular body and a rounded edged end portion angled outward and away from the substantially flat, rectangular body; and
   a plurality of nodules or protrusions positioned on an inside surface of the two substantially parallel prongs and an inside surface of the substantially flat, rectangular body, wherein the nodules or protrusions are configured to securely grip the worn garment when inserted between the prongs and the substantially flat rectangular body.

* * * * *